(12) United States Patent
Shapira (10) Patent No.: US 7,570,624 B2
(45) Date of Patent: Aug. 4, 2009

(54) DEVICE, SYSTEM AND METHOD OF UPLINK/DOWNLINK COMMUNICATION IN WIRELESS NETWORK

(75) Inventor: Nir Shapira, Raanana (IL)

(73) Assignee: Celeno Communications (Israel) Ltd., Ra'anana (IL)

( * ) Notice: Subject to any disclaimer, the term of this patent is extended or adjusted under 35 U.S.C. 154(b) by 426 days.

(21) Appl. No.: 11/319,658

(22) Filed: Dec. 29, 2005

(65) Prior Publication Data

US 2007/0153748 A1 Jul. 5, 2007

(51) Int. Cl.
*H04W 4/00* (2006.01)
*H04W 72/00* (2006.01)
*H04J 3/00* (2006.01)
*H04B 7/212* (2006.01)
*H04L 12/413* (2006.01)

(52) U.S. Cl. .......................... 370/338; 370/348; 455/450

(58) Field of Classification Search ................. 370/328, 370/329, 330, 338, 341, 345, 347, 348, 445; 455/427.1, 450, 452.1, 453

See application file for complete search history.

(56) References Cited

U.S. PATENT DOCUMENTS

| | | | |
|---|---|---|---|
| 6,563,858 B1 | 5/2003 | Fakatselis et al. | |
| 6,873,293 B2 | 3/2005 | Proctor, Jr., et al. | |
| 6,928,047 B1 | 8/2005 | Xia | |
| 6,940,843 B2 | 9/2005 | Goodall et al. | |
| 6,961,545 B2 | 11/2005 | Tehrani et al. | |
| 6,970,682 B2 | 11/2005 | Crilly, Jr. et al. | |
| 7,034,759 B2 | 4/2006 | Proctor, Jr. et al. | |
| 7,039,090 B2 | 5/2006 | Boetzel et al. | |
| 7,039,137 B1 | 5/2006 | Lauterjung et al. | |
| 7,050,402 B2 | 5/2006 | Schmidl et al. | |
| 7,088,671 B1 | 8/2006 | Monsen | |
| 7,099,380 B1 | 8/2006 | Feng et al. | |
| 7,103,326 B2 | 9/2006 | Wu et al. | |
| 7,120,468 B1 | 10/2006 | Wilhoyte et al. | |
| 7,139,321 B2 | 11/2006 | Giannakis et al. | |
| 7,149,254 B2 | 12/2006 | Sampath | |
| 2002/0041635 A1 | 4/2002 | Ma et al. | |
| 2002/0150168 A1 | 10/2002 | Crawford | |
| 2002/0160737 A1 | 10/2002 | Crawford | |

(Continued)

OTHER PUBLICATIONS

Tse et al., "Fundamentals of Wireless Communication", Sep. 10, 2004, pp. 523-548, Cambridge University Press.

(Continued)

*Primary Examiner*—Alexander Eisen
*Assistant Examiner*—Michael T Thier
(74) *Attorney, Agent, or Firm*—Pearl Cohen Zedek Latzer, LLP (57) ABSTRACT

Some demonstrative embodiments of the invention include a method device and/or system of scheduling transmissions of one or more wireless communication stations. The method, according to some demonstrative embodiments may include instructing a plurality of wireless communication stations to set a transmission-disable counter to count a first value corresponding to a selective-transmission time period during which transmission by only a selected one of the plurality of stations is to be allowed; and instructing the selected station to set its transmission-disable counter to a second value that allows transmission of the selected station during at least part of the selective-transmission time period. Other embodiments are described and claimed.

16 Claims, 5 Drawing Sheets

U.S. PATENT DOCUMENTS

| | | |
|---|---|---|
| 2002/0188750 A1* | 12/2002 | Li .............................. 709/235 |
| 2004/0125820 A1* | 7/2004 | Rios ........................... 370/480 |
| 2005/0025042 A1 | 2/2005 | Hadad |
| 2005/0025176 A1* | 2/2005 | Ko et al. ..................... 370/448 |
| 2005/0047322 A1 | 3/2005 | Sondur |
| 2005/0047384 A1 | 3/2005 | Wax et al. |
| 2005/0063408 A1* | 3/2005 | Famolari ................... 370/431 |
| 2005/0136933 A1 | 6/2005 | Sandhu et al. |
| 2005/0141412 A1 | 6/2005 | Sadri et al. |
| 2005/0147023 A1 | 7/2005 | Stephens et al. |
| 2005/0233709 A1 | 10/2005 | Gardner et al. |
| 2005/0286474 A1 | 12/2005 | van Zelst et al. |
| 2006/0023803 A1 | 2/2006 | Perlman et al. |
| 2006/0286937 A1 | 12/2006 | Russell et al. |
| 2006/0291439 A1 | 12/2006 | Yang et al. |
| 2006/0291544 A1 | 12/2006 | Fischer et al. |

OTHER PUBLICATIONS

Yoo et al., On the Optimality of Multi-Antenna Broadcast Scheduling Using Zero-Forcing Beamforming, pp. 1-13, Published Mar. 2006.

* cited by examiner

DEVICE, SYSTEM AND METHOD OF UPLINK/DOWNLINK COMMUNICATION IN WIRELESS NETWORK

FIELD OF THE INVENTION

The invention relates to the field of wireless communication.

BACKGROUND OF THE INVENTION

A wireless communication network may include, for example, a wireless Access Point (AP) and multiple wireless communication stations able to communicate using a wireless medium. A communication collision may occur, for example, when a first wireless station and a second wireless station transmit data at substantially the same time.

To reduce communication collisions, a Collision Avoidance (CA) mechanism may be used. For example, a wireless station may avoid transmission for a "backoff" period of time, determined individually by the station based on a pseudo-random number of units between zero and a pre-defined maximum Contention Window (CW) parameter. Accordingly, a first station may avoid transmission for a first pseudo-random backoff period, and a second station may avoid transmission for a second, different, pseudo-random backoff period, thereby avoiding collision between the transmissions of the first and second stations. Furthermore, a retransmission procedure may be invoked upon detecting a communication collision.

Unfortunately, when multiple stations contend simultaneously for a wireless medium, the CA mechanism and/or the retransmission procedure may result in poor network performance, e.g., poor network throughput, which may not be resolved by adjusting the CW parameter. For example, setting the CW parameter at a low value may increase contentions, whereas setting the CW parameter at a high value may result in long transmission delays.

SUMMARY OF SOME DEMONSTRATIVE EMBODIMENTS OF THE INVENTION

Some demonstrative embodiments of the invention include a method device and/or system of scheduling transmissions of one or more wireless communication stations.

According to some demonstrative embodiments of the invention, the method may include instructing a plurality of wireless communication stations to set a transmission-disable counter, e.g., a network vector allocation counter, to count a first value corresponding to a selective-transmission time period during which transmission by only a selected one of the plurality of stations is to be allowed.

The method may also include instructing the selected station to set its transmission-disable counter to a second value that allows transmission of the selected station during at least part of the selective-transmission time period.

According to some demonstrative embodiments of the invention, instructing the selected station may include, for example, transmitting to the selected station a protection-end frame. For example, the method may include transmitting the protection-end frame such that the protection-end frame is not received by one or more other stations of the plurality of stations.

According to some demonstrative embodiments of the invention, transmitting the protection-end frame may include, for example, generating a set of N spatial channels to be transmitted to the selected station, using a set of N respective antennas, by applying at least one preceding matrix to a set of inputs including the protection-end frame and one or more dither sequences. The preceding matrix, may include, for example, a beamforming vector based on channel state information of the selected station and one or more additional vectors orthogonal to the beamforming vector.

According to some demonstrative embodiments of the invention, transmitting the protection-end frame may include, for example, allocating transmission power to the set of N spatial channels to be transmitted to the selected station such that the power to be received by the selected station is not greater, by more than a predefined power margin, than a minimum power required for reception at a desired quality of service.

According to some demonstrative embodiments of the invention, the protection-end frame may include, for example, a contention-free-end frame.

According to some demonstrative embodiments of the invention, instructing the plurality of stations may include transmitting a medium-access-control frame having a duration field corresponding to the first value. For example, the medium-access-control frame may include a clear-to-send-to-self frame.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF SOME DEMONSTRATIVE EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that the present invention may be used in a variety of applications. Although the present invention is not limited in this respect, the circuits and techniques disclosed herein may be used in many apparatuses such as personal computers, stations of a radio system, wireless communication system, digital communication system, satellite communication system, and the like.

Stations intended to be included within the scope of the present invention include, by way of example only, wireless local area network (WLAN) stations, wireless personal area network (WPAN) stations, two-way radio stations, digital system stations, analog system stations, cellular radiotelephone stations, and the like.

Types of WLAN communication systems intended to be within the scope of the present invention include, although are not limited to, "IEEE-Std 802.11, 1999 Edition (ISO/IEC 8802-11: 1999)" standard, and more particularly in "IEEE-Std 802.11b-1999 Supplement to 802.11-1999,Wireless LAN MAC and PHY specifications: Higher speed Physical Layer (PHY) extension in the 2.4 GHz band", "IEEE-Std 802.11a-1999, Higher speed Physical Layer (PHY) extension in the 5 GHz band" standard, "IEEE-Std 802.11g-2003 Supplement to 802.11-1999, Wireless LAN MAC and PHY specifications: Further Higher Data Rate Extension in the 2.4 GHz band, Draft 8.2" standard, and the like.

Types of WLAN stations intended to be within the scope of the present invention include, although are not limited to, stations for receiving and transmitting spread spectrum signals such as, for example, Frequency Hopping Spread Spectrum (FHSS), Direct Sequence Spread Spectrum (DSSS), Orthogonal Frequency-Division Multiplexing (OFDM) and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a local area network (LAN), a wide area network (WAN), or a global communication network, for example, the Internet.

Figure 1:
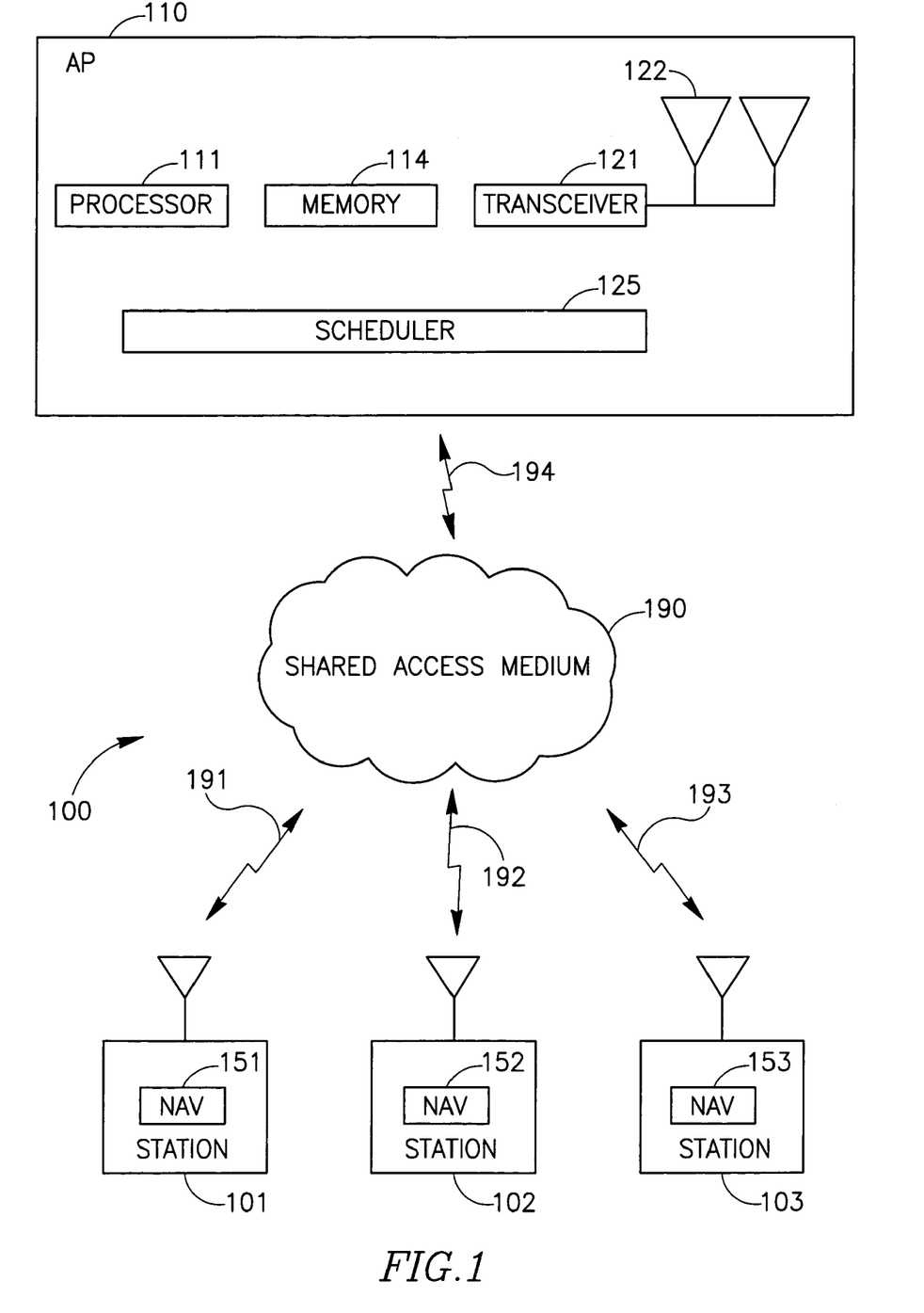
FIG. 1 is a schematic block diagram illustration of a wireless communication system utilizing uplink/downlink communication in accordance with an embodiment of the invention.

FIG. 1 schematically illustrates a block diagram of a wireless communication system 100 utilizing uplink/downlink communication in accordance with an embodiment of the invention. System 100 may include, for example, one or more wireless Access Points (APs), e.g., an AP 110, and one or more wireless communication stations, e.g., stations 101, 102 and/or 103. Station 101, station 102, station 103 and AP 110 may communicate using a shared access medium 190, for example, through wireless communication links 191, 192, 193 and 194, respectively. System 100 may optionally include other and/or additional components.

According to some demonstrative embodiments of the invention, AP 110 may include, for example, a processor 111, a memory unit 114, and a transceiver 121. AP 110 may further include other suitable hardware components and/or software components.

Processor 111 may include, for example, a Central Processing Unit (CPU), a Digital Signal Processor (DSP), a microprocessor, a controller, a chip, a microchip, an Integrated Circuit (IC), or any other suitable multi-purpose or specific processor or controller. Processor 111 may, for example, process data received by AP 110, and/or process data intended for transmission by AP 110.

Memory unit 114 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units. Memory unit 114 may, for example, store data received by AP 110, and/or store data intended for transmission by AP 110.

Transceiver 121 may include, for example, a wireless Radio Frequency (RF) transceiver able to transmit and/or receive RF signals, e.g., through a plurality of antennas 122. Transceiver 121 may be implemented using a transmitter, a receiver, a transmitter-receiver, or one or more units able to perform separate or integrated functions of transmitting and/or receiving wireless communication signals, blocks, frames, transmission streams, packets, messages and/or data.

Although the invention is not limited in this respect, antennas 122 may include, for example, a set of N antennas, e.g., suitable for Spatial division multiple access (SDMA) transmission. Antennas 122 may include, for example, an internal and/or external RF antenna, e.g., a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data.

Station 101, station 102 and station 103 may include, for example, a wireless communication station or a wireless communication device able to transmit and/or receive wireless communication signals. Stations 101, 102 and 103 may include three respective transmission-disable counters. For example, stations 101, 102, 103 may include Network-Allocation Vectors (NAVs) 151, 152 and 153, which may include a counter decremented towards an allow-transmission value, for example, zero, e.g., as is known in the art. Alternatively, stations 101, 102, and/or 103 may include any other suitable transmission disable counters.

According to some demonstrative embodiments of the invention, stations 101, 102 and/or 103 may set NAVs 151, 152, and 153, respectively, to a value of a duration field included in a received Medium Access Control (MAC) frame. Once the values of NAV 151, 152 and/or 153 are set, the values may be gradually incremented or decremented toward the allow-transmission value. Stations 101, 102, and/or 103 may not be permitted to transmit as long as the value of NAVs 151, 152, and/or 153, respectively, is different than the allow-transmission value.

According to some demonstrative embodiments of the invention, stations 101, 102, and/or 103 may be allowed to transmit when the value of NAV 151, 152, and/or 153 is equal to the allow-transmission value, e.g., after a waiting period elapses. The waiting period may include, for example, a pre-defined (e.g., constant or fixed) period which may be referred to as Inter-Frame Space (IFS), e.g., a Distributed IFS (DIFS); and a variable-length waiting period which may be referred to as a backoff period. The length of the backoff period may be determined by each of stations 101, 102, and/or 103 by drawing, e.g., randomly or pseudo-randomly, a number between zero and a Contention Window (CW) parameter; the drawn number indicates the number of time slots to be included in the backoff period. It is noted that the IFS waiting period may include one or more portions, or may be based on one or more IFS parameters, for example, DIFS, Short IFS (SIFS), or the like.

Once the waiting period of stations 101, 102, and/or 103 elapses, e.g., once the IFS period (e.g., the DIFS period) and the backoff period elapse, stations 101, 102, and/or 103 may transmit, e.g., if carrier sense mechanisms of stations 101, 102, and/or 103, respectively, determine that the wireless medium is free; and/or if the value of NAVs 151, 152, and/or 153 is equal to the allow-transmission value.

According to some demonstrative embodiments of the invention, AP 110 may schedule uplink transmissions of stations 101, 102, and/or 103 according to a predetermined scheduling scheme, e.g., in order to reduce communication collisions. For example, AP may selectively allocate one or more time periods to stations 101, 102, and/or 103, e.g., based on any suitable allocation criteria. AP 110 may allocate to a selected one of stations 101, 102, and 103, e.g., station 101 ("the selected station"), a selective-transmission time period during which transmission by only the selected station is to be allowed.

According to some demonstrative embodiments of the invention, AP 110 may include a transmission scheduler 125 to instruct stations 101, 102 and 103 to set NAVs 151, 152 and 153, respectively, to count a value ("the reserved value") corresponding to the selective-transmission time period during which transmission by only the selected station is to be allowed. For example, scheduler 125 may transmit a MAC frame including a duration field corresponding to the reserved value. The MAC frame may include, for example, a Clear-To-Send to self (CTS to self) frame, e.g., as defined by the 802.11 standard.

According to some demonstrative embodiments of the invention, stations 101, 102 and 103, may set NAVs 151, 152, and 153 to the reserved value, e.g., upon receiving the MAC frame from AP 110. Accordingly, stations 101, 102 and 103 may not attempt to perform a transmission, e.g., as long as the value of NAVs 151, 152 and 153 is not equal to the transmission-allow value.

According to some demonstrative embodiments of the invention, scheduler 125 may also instruct the selected station to set its transmission-disable counter to a second value that allows transmission of the selected station during at least part of the selective-transmission time period, e.g., as described below.

According to some demonstrative embodiments of the invention, scheduler 125 may transmit to station 110 a frame ("the protection-end frame"), e.g., a MAC frame, instructing station to set NAV 151 to the transmission-allow value or to any other value that allows transmission of the selected station during at least part of the selective-transmission time period. For example, scheduler 125 may transmit to station 101 a contention-free-end (CF-end) frame, e.g., as defined by the 802.11 standard.

According to some demonstrative embodiments of the invention, AP 110 may be able to transmit the protection-end frame such that station 101 receives the protection-end frame, while one or more other stations, e.g., stations 102 and/or 103 do not receive the protection-end frame. For example, AP may implement an SDMA transmission scheme enabling selective transmission of a frame to a selected station, e.g., as described below with reference to FIGS. 3, 4, and/or 5.

According to some demonstrative embodiments of the invention, station 101 may set NAV 151 to the transmission-allow value, e.g., upon receiving the protection-end frame from AP 110.

According, to some demonstrative embodiments of the invention, the NAVs, e.g., NAVs 152 and/or 153, of stations not receiving the protection-end frame, e.g., stations 102 and/or 103, may have values different than the transmission-allow value, e.g., during the selective-transmission time period. Accordingly, stations 102 and/or 103 may avoid transmission during the selective-transmission time period. As a result, the waiting period utilized by station 101 prior to transmission of an uplink frame, may be different, e.g., shorter, than the waiting periods utilized by stations 102 and 103 prior to transmission of an uplink frame. For example, station 101 may be allowed to transmit an uplink frame while stations 102 and/or 103 may not yet be permitted to transmit an uplink frame, thereby allowing station 101 to transmit an uplink frame without communication collisions.

According to some demonstrative embodiments of the invention, station 101 may be allowed to transmit one or more frames during at least part of the selective-transmission time period, e.g., after receiving the protection end frame from AP 110. In response, AP 110 may transmit to station 101 an acknowledgement (ACK) frame.

According to some demonstrative embodiments of the invention, AP 110 may then repeat the process, for example, by instructing only one other station, e.g., station 102, to set its NAV, e.g., NAV 152, to the transmission-allow value, e.g., after disabling transmission of the remaining stations, e.g., stations 101 and/or 103. This may allow AP 110 to schedule uplink and/or downlink transmissions, e.g., with regard to one station at a time, while eliminating or reducing collisions.

Some demonstrative embodiments of the invention relate to an AP, e.g., AP 110, able to instruct a selected station, e.g., station 101, to set its transmission-disable counter, e.g., NAV 151, to the transmission-allow value. However it will be appreciated by those skilled in the art that other embodiments of the invention may include an AP able to instruct the selected station to set its transmission-disable counter to any other value that allows transmission by the selected station during at least part of the selective-transmission time period. For example, the AP may instruct the selected station to set the transmission-disable counter to a value ("the selected value") smaller than the reserved value and bigger than the transmission-allow value. For example, the AP may transmit only to the selected station a MAC frame, e.g., a CTS-to-self frame, including a duration corresponding to the selected value.

According to some demonstrative embodiments of the invention, scheduler 125 may be implemented, for example, as a hardware component, as a software component, as a combined hardware/software component, as part of processor 111, as part of transceiver 121, as a unit or sub-unit of AP 110, as part of a MAC module or MAC layer or MAC component of AP 110, as a communication driver, as a dedicated controller, as an Integrated Circuit (IC), or the like. In some embodiments, scheduler 125 may be operatively associated with, or may communicate with, one or more components of AP 110, for example, processor 111, transceiver 121, a MAC module, a MAC component, a MAC layer, other (e.g., upper) layers of AP 110, layers or components or controllers of AP 110 which may control or perform downlink and/or uplink scheduling or the like.

In some embodiments, AP 110 may "grab" control of the shared access medium 190, e.g., subsequent to an uplink transmission by station 101 and prior to potential transmissions by stations 102 and/or 103. For example, AP 110 may receive the uplink frame transmitted by station 101, and may transmit a downlink frame (e.g., to station 101, to station 102, or to station 103) within a time period which may be shorter than the IFS (e.g., the DIFS) period. This may, for example, ensure that the downlink frame is transmitted after the uplink frame is received and prior to subsequent uplink transmissions.

Figure 2:
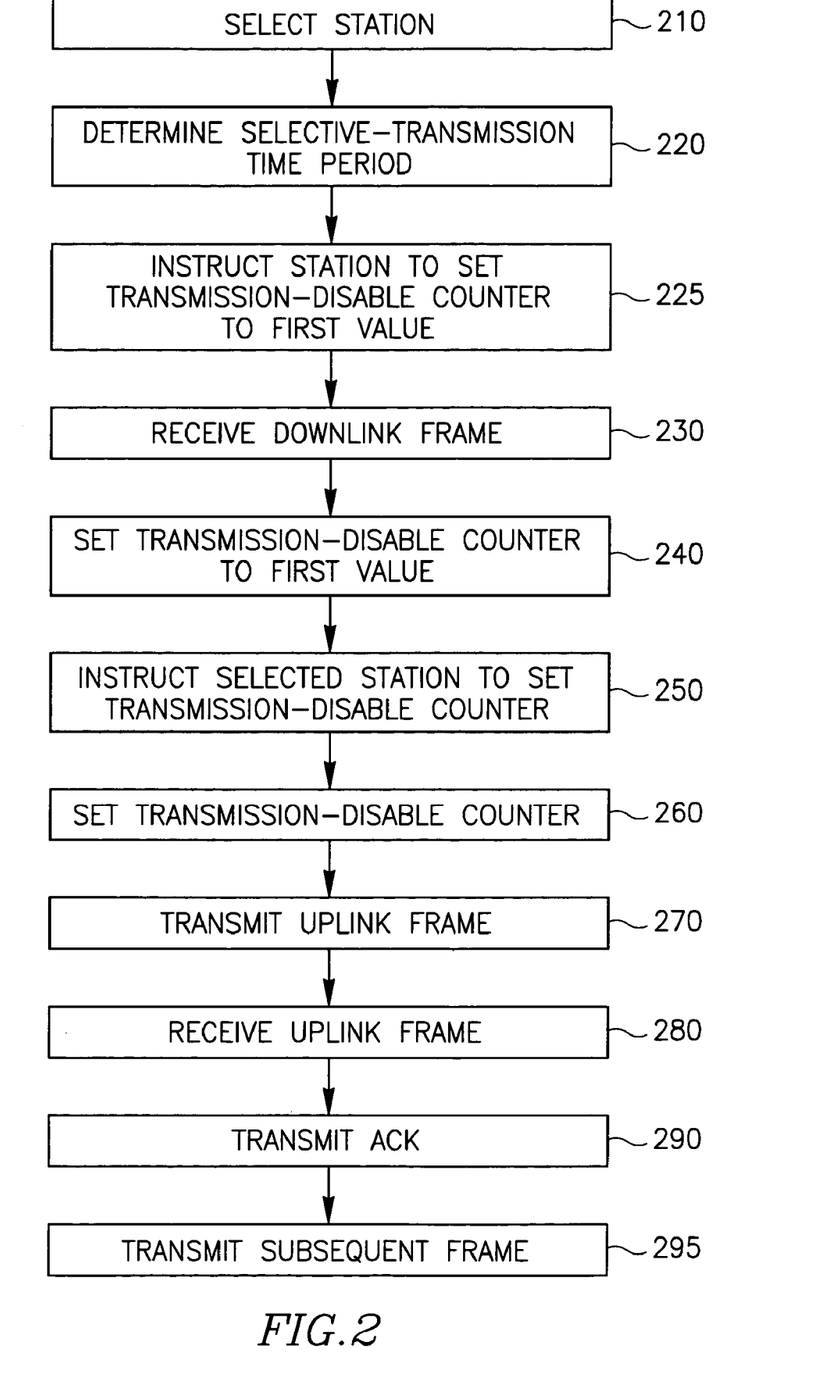
FIG. 2 is a schematic flow-chart of a method of uplink/downlink communication in accordance with some demonstrative embodiments of the invention.

Reference is made to FIG. 2, which is a schematic flowchart of a method of uplink/downlink communication in accordance with some demonstrative embodiments of the invention. Operations of the method may be implemented, for example, by system 100 of FIG. 1, by AP 110 of FIG. 1, by scheduler 125 of FIG. 1, and/or by other suitable APs, transceivers, units, devices, and/or systems.

As indicated at block 210, the method may include, for example, selecting from a plurality of stations a station, e.g., station 101 (FIG. 1), to which a selective-transmission time period is to be allocated, e.g., according to any suitable scheduling scheme. This may be performed, for example, by scheduler 125 (FIG. 1).

As indicated at block 220, the method may include, for example, determining the length of the selective-transmission time period. This may be performed, for example, by scheduler 125 as described above with reference to FIG. 1.

As indicated at block 225, the method may include instructing the plurality of stations to set a transmission-disable counter to count a first value corresponding to the selective-transmission time period. This may be performed, for example, by scheduler 125 (FIG. 1) and/or transceiver 121 (FIG. 1). For example, scheduler 125 (FIG. 1) may control transceiver 121 (FIG. 1) to transmit a downlink frame, for example, a MAC frame, e.g., a CTS-to-self frame, including a duration field corresponding to the first value.

As indicated at block 230, the method may include, for example, receiving the downlink frame. This may be performed, for example, by stations 101, 102 and/or 103 (FIG. 1).

As indicated at block 240, the method may include setting the transmission-disable counters of stations receiving the downlink frame to the duration value of the downlink frame. For example, stations 101, 102 and/or 103 may set the value of NAVs 151, 152, and/or 153, respectively, to the first value.

As indicated at block 250, the method may include, for example, instructing the selected station to set its transmission-disable counter to a second value that allows transmission of the selected station during at least part of the selective-transmission time period. According to some demonstrative embodiments of the invention, this may include transmitting to the selected station another downlink frame, for example, a MAC frame, e.g., a protection-end frame, such that the protection-end frame is not received by one or more other stations of the plurality of stations. This may be performed, for example, by scheduler 125 (FIG. 1) and/or transceiver 121 (FIG. 1). For example, scheduler 125 (FIG. 1) may control transceiver 121 (FIG. 1) to transmit the protection-end frame, e.g., a CF-end frame, such that it is received by station 101 and not received by stations 102 and/or 103.

As indicated at block 260, the method may include setting the transmission-disable counter of the selected station to the second value. This may be performed, for example, by station 101 (FIG. 1), e.g., upon receiving the protection-end frame from AP 110 (FIG. 1).

As indicated at block 270, the method may include, for example, transmitting an uplink frame. This may be performed, for example, by the selected station. The transmission may begin, for example, once the selected station sets the transmission-disable counter to the second value, or shortly afterwards (e.g., after a backoff period).

As indicated at block 280, the method may include, for example, receiving the uplink frame. This may be performed, for example, by AP 110 (FIG. 1).

As indicated at block 290, the method may include, for example, transmitting an acknowledgment (ACK) frame. This may be performed, for example, by AP 110 (FIG. 1).

As indicated at block 295, the method may include, for example, transmitting a subsequent downlink frame. Optionally, this may be performed within a time period which is smaller than the IFS (e.g., DIFS) time period after the reception of the uplink frame ended.

One or more of the above operations may be repeated. Other suitable operations or sets of operations may be used in accordance with embodiments of the invention.

Some embodiments of the invention may be used, for example, in conjunction with Voice Over Internet Protocol (VoIP) applications, applications utilizing substantially symmetric communications, and/or applications utilizing a substantially constant bit rate, application utilizing communication at pre-defined time intervals, or the like.

For example, in a communication system according to one embodiment, an AP may support, for example, ten VoIP calls performed by ten, respective, stations. VoIP frames may be transmitted at pre-defined time intervals, e.g., 20 milliseconds, at both uplink and downlink directions. The AP may divide the 20 milliseconds time interval to multiple slots, for example, ten two-milliseconds slots, e.g., similar to Time-Division Multiple Access (TDMA). A two-millisecond slot may be divided into a downlink slot and a corresponding uplink slot. In each of the ten two-millisecond slots, the AP may utilize the scheduling mechanism described above in relation to each of the ten stations, respectively. For example, in the first two-millisecond slot, the AP may utilize the scheduling mechanism to permit a first station to transmit an uplink frame; in the second two-millisecond slot, the AP may utilize the scheduling mechanism to permit a second station to transmit an uplink frame; in the third two-millisecond slot, the AP may utilize the scheduling mechanism to permit a third station to transmit an uplink frame; etc.

Figure 3:
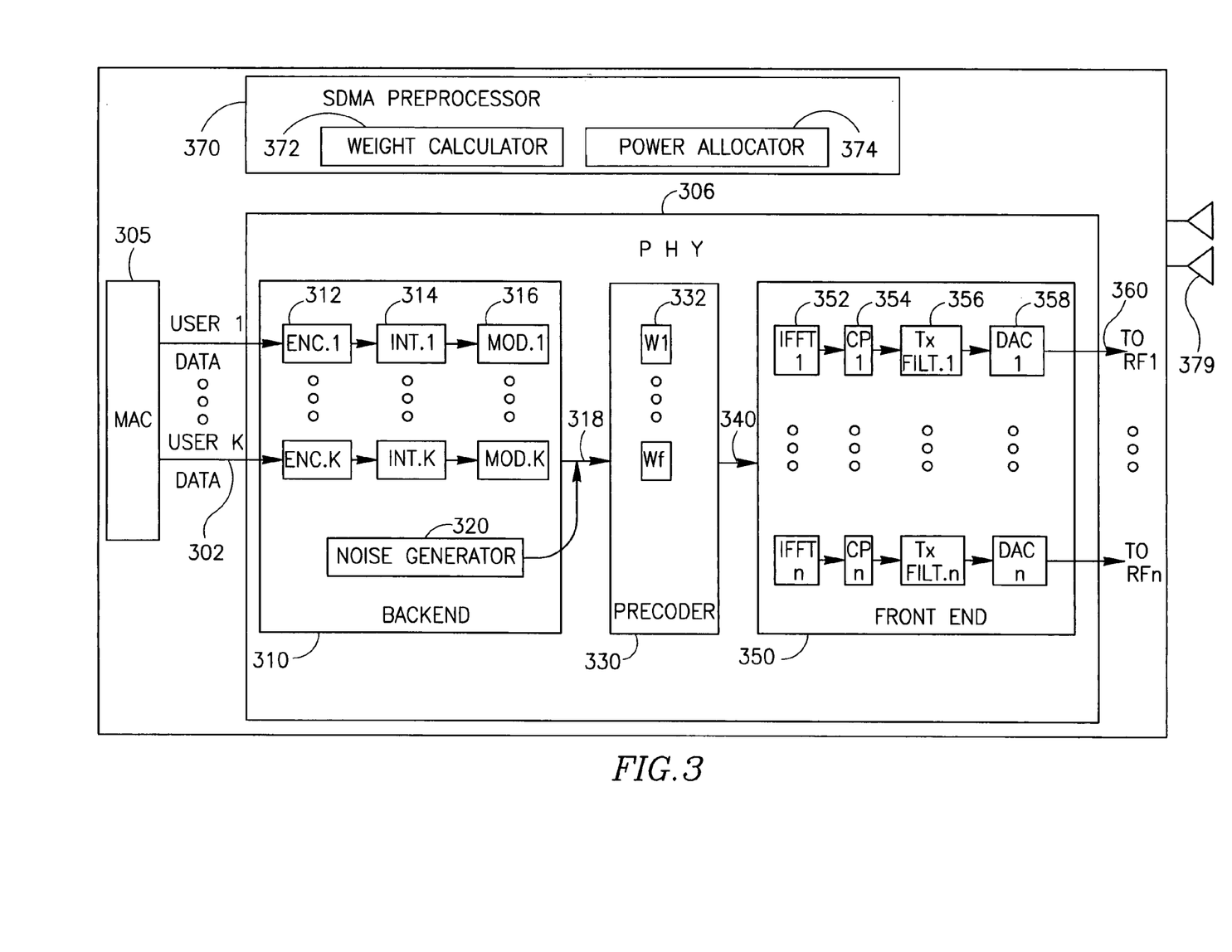
FIG. 3 is a schematic diagram of components of an access point in accordance with demonstrative embodiments of the invention.

Reference is made to FIG. 3, which schematically illustrates components of an access point 300 in accordance with some demonstrative embodiments of the invention. Although the invention is not limited in this respect, access point 300 may perform the functionality of AP 110 (FIG. 1).

According to some non-limiting demonstrative embodiments of the invention, AP 300 may be adapted to perform combined Orthogonal Frequency Division Multiplexing (OFDM)-SDMA transmission. For example, simultaneous SDMA transmission to K (K≧1) destination stations using N transmit antennas may be performed independently for each frequency in an OFDM modulation scheme having F frequencies, as explained in detail below. It will be appreciated that other transmission schemes are possible, for example, SDMA may be combined with Direct Sequence Spread Spectrum (DSSS) signals used in the 802.11b standard, or any other suitable modulation scheme as is known in the art. For example, in a DSSS-SDMA transmission system, SDMA precoding may be performed in the time domain, as opposed to frequency domain precoding for the OFDM case.

Although the invention is not limited in this respect, AP 300 may include a MAC 305, a Physical layer (PHY) 306, and/or a plurality of antennas 379. AP 300 may also include a SDMA preprocessor 370 to determine one or more precoding values to be applied to one or more transmissions to one or more respective receivers, as described below. For example, preprocessor 370 may include one or more modules units, e.g., a weight calculation module 372 to calculate beamforming weights according to a beamforming scheme of the present invention; and/or a power allocation module 374 to selectively allocate power for transmitted signals according to a power allocation scheme of the present invention, as described in detail below. Although the invention is not limited in this respect, preprocessor 370 may include high-bandwidth inputs, e.g., for receiving channel estimates; and/or high-bandwidth outputs, e.g., for providing the precoding values. Preprocessor 370 may be implemented using any suitable combination of memory, hardwired logic, and/or general-purpose or special-purpose processors, as is known in the art. In accordance with different demonstrative embodiments of the invention, preprocessor 370 may be implemented as a separate entity or as subsystem of MAC 305 and/or PHY 306.

According to some demonstrative embodiments of the invention, AP 300 may generate a set of spatial channels, e.g., N spatial channels, to be transmitted, using antennas 379, to a set of destination stations, e.g., K destination stations, by applying a preceding matrix to a set of inputs including a set of-transmissions, e.g., K transmissions, intended to the set of destination stations, respectively, and one or more dither sequences, e.g., as described in detail below. The precoding matrix may include, for example, a set of beamforming vectors, e.g., K beamforming vectors, which may be based, for example, on channel state information of the set of destination stations, respectively; and one or more additional vectors orthogonal to the beamforming vectors.

According to some demonstrative embodiments of the invention, in addition to or instead of applying the preceding matrix described above, AP 300 may allocate transmission power to the set of channels such that the power to be received by each of the set of destination stations may not be greater than a minimum power required for reception at a desired quality of service, for example by more than a predefined power margin, as described in detail below.

According to some demonstrative embodiments of the invention, MAC 305 may send to PHY 306 a plurality of user data signals 302, e.g., K user data signals, containing frames of data for the K intended recipients, respectively. PHY 306 may include a backend 310, a precoder 330, and/or a frontend 350, as are described below.

According to some demonstrative embodiments of the invention, backend 310 may include a plurality of branches, e.g., K branches to handle the user data of signals 302, e.g., as described below. Precoder 330 may apply a plurality of preceding values to the branches of signals 302. For example, precoder 330 may apply one or more precoding matrices, e.g., F precoding matrices, to multiplex the data of the K users to N antennas in each of the F frequency bins. Frontend 350 may include N branches for processing the signals to be transmitted over the N antennas.

According to some demonstrative embodiments of the invention, each of user data signals 302 may be processed, for example, by a separate branch of backend 310. For example, a backend branch of backend 310 may include an encoder 312 to perform Forward Error Correction (FEC), an interleaver 314 to perform a permutation of the bits, and a modulator 316 to map the data bits into constellation points that may be modulated in different frequency bins. It will be appreciated that such backend operations may be in accordance with the 802.11a standard for OFDM wireless communication, as is known in the art. In addition, encoder 312, interleaver 314, and modulator 316 may also be adapted for use with any other suitable modulation scheme as is known in the art.

In accordance with some embodiments of the invention, AP 300 may also include a noise generator 320 to provide at least one noise dither sequence in addition to the K user signals. For example, noise generator 320 may be able to generate random bits and insert the random bits into the input of modulator 316 to be mapped to constellation points along with the data bits. Alternatively, noise generator 320 may be able to insert one or more dither sequences after the modulation of user data 302 by modulator 316. Although the invention is not limited in this respect, noise generator 320 may be implemented, for example, as part of PHY 306.

According to some demonstrative embodiments of the invention, an output 318 of backend 310 may be processed by precoder 330. Output 318 may include K user data signals, corresponding to user data 302, and at least one noise signal, e.g., up to N-K noise signals, corresponding to the at least one dither sequence inserted by noise generator 320. Precoder 330 may map, for example, K user streams of output 318 into N antenna streams 340. For example, precoder 330 may apply to output 318 F orthogonal preceding matrices 332 corresponding to the F frequency bins used for OFDM, respectively.

In accordance with some demonstrative embodiments of the invention, one or more of precoding matrices 332 may include a set of beamforming vectors, e.g., K beamforming vectors, corresponding to the set of destination stations, and one or more additional vectors, e.g., up to N-K additional vectors.

According to some demonstrative embodiments of the invention, one or more of the vectors may include a set of precoding values. For example, each one of the beamforming vectors and/or the additional vectors may include N precoding values. Accordingly, each one of matrices 332 may include, for example, an N×N matrix.

According to some demonstrative embodiments of the invention one or more of the precoding values may be determined, for example, by one or more modules of SDMA preprocessor 370, e.g., weight calculation module 372 and/or power allocation module 374.

According to some demonstrative embodiments of the invention, weight calculator 372 may calculate one or more beamforming weights, e.g., as described below. Additionally or alternatively, power allocator 374 may determine one or more power allocation factors corresponding to one or more of the destination stations, e.g., as described below. One or more precoding values of matrices 332 may be determined based on the beamforming weights and/or the power allocation factors. For example, one or more precoding values of matrices 332 may be determined based on one or more products of the one or more power allocation factors and the one or more beamforming weights, respectively.

Antenna streams 340 may be processed by frontend 350, which may include N transmission branches.

Frontend 350 may include any suitable front end hardware and/or software, Although the invention is not limited in this respect, each branch of Frontend 350 may include, for example, an Inverse Fast Fourier Transform 352, a Cyclic Prefix (CP) insertion module 354, a transmission filter 356, and/or a Digital to Analog Converter (DAC), e.g., as are known in the art.

Figure 4:
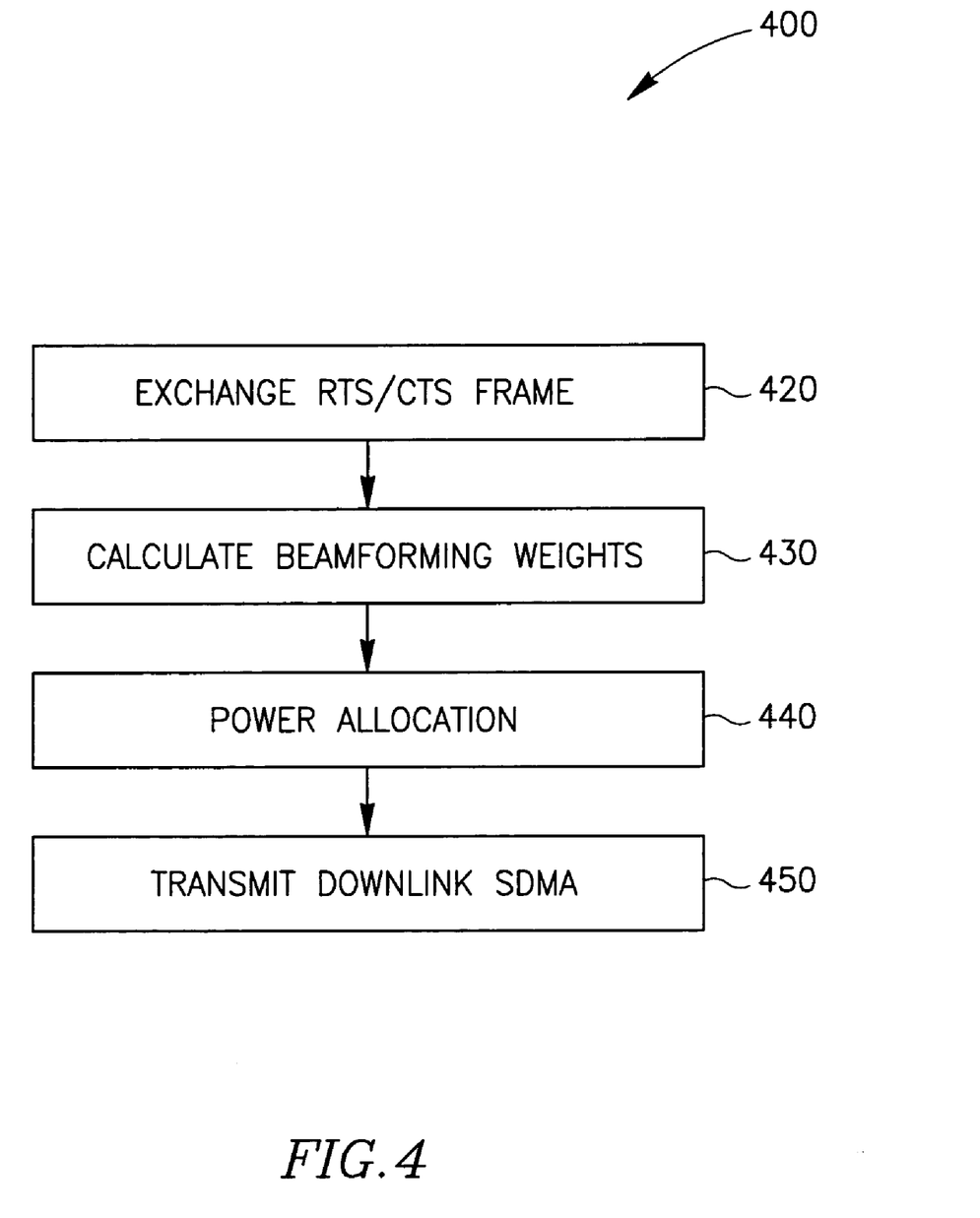
FIG. 4 is a schematic flowchart of a method of wireless transmission in accordance with some demonstrative embodiments of the invention.

Reference is made to FIG. 4, which schematically illustrates a wireless transmission method 400 in accordance with one demonstrative embodiment of the invention. Although the invention is not limited in this respect, transmission method 400 may be performed, e.g., by AP 300 (FIG., 3) to transmit a frame, e.g., a protection-end flame, to a selected station, e.g., station 101 (FIG. 1).

As indicated at block 420, method 400 may optionally include channel state information of the selected station. For example, the method may optionally include exchanging ready-to-send/clear-to-send (RTS/CTS) frames with the selected station. In accordance with some demonstrative embodiments of the invention, the transmitting AP, e.g., AP 300, may be able to estimate the selected destination station's spatial signature from the received CTS frame. For example, AP 300 may receive the return CTS frame at each of the N antennas 379, providing a replica of the received signal multiplied by a complex channel coefficient factor $h_i$ wherein i=1 . . . N, known as the spatial signature of the station. As is known in the art, the spatial signature vector $h_i$ may be a representation of the channel between the AP and the selected station.

Optionally, the RTS/CTS exchange may be skipped to reduce network overhead, for example, if the transmitting AP already has an updated estimate for the selected station's spatial signature. Although the invention is not limited in this respect, an estimate may be considered up-to-date if it is obtained, e.g., within 10% of the channel coherence time. For example, in a slowly moving environment, channel coherence time may be around 300 milliseconds, and an estimate may be considered up-to-date if it is not more than 30 milliseconds old. As is known in the art, channel coherence time is a measure of the speed at which the channel characteristics change.

As indicated at block 430, method 400 may include calculating beamforming weights, e.g., to provide values for precoding matrix 332, as explained above with reference to FIG. 3. Although the invention is not limited in this respect, in the case of transmission to a single user, e.g., the selected station, a beamforming weight vector corresponding to the spatial signature of the selected station may be used. For example, a maximum ratio combining (MRC) vector may be calculated, e.g., by weight calculation module 372 (FIG. 3), by setting $w_i$ equal to the complex conjugate of $h_i$ for i=1 . . . N. It will be appreciated by those of skill in the art that a MRC vector corresponding to the spatial signature of the selected station may provide an optimal set of weights for transmitting to the selected station, e.g., in terms of increasing SNR. as the signal may be maximized at the location of the selected station.

According to some embodiments of the invention, method 400 may include designing one or more, e.g., up to N-1, additional vectors orthogonal to the calculated beamforming vector, to represent noise dither sequences. For example, a Householder Transform technique, as is known in the art, may be used to supplement the precoding matrix, e.g., by complementing the calculated beamforming vector with an additional N-K orthogonal vectors. Thus, the precoding matrix may represent up to N orthogonal spatial channels.

Additionally or alternatively, according to some embodiments of the invention, as indicated at block 440, method 400 may include selectively allocating power to each spatial channel in accordance with a power allocation scheme of the present invention. For example, in the case of transmission to a single selected station, the power allocation scheme may assign power to the selected station to avoid transmission power in excess of a minimum power required for proper reception by the selected station. For example, the power allocation scheme may assign power that is marginally above a threshold level based on parameters of a desired level of quality and/or security. A power allocation scheme in accordance with some demonstrative embodiments of the invention is explained in detail below with reference to FIG. 5. For example, power allocator 374 may determine the power allocation factor corresponding to the selected station, e.g., as described below with reference to FIG. 5. SDMA preprocessor 370 may apply the determined factor to the beamforming vector and provide precoder 330 with precoding values based on the allocation factor and/or the beamforming weight values.

Although the invention is not limited in this respect, residual power that is not allocated to the signal transmitted to the selected station may be distributed among the remaining spatial channels, e.g., evenly.

As indicated at block 450, method 400 may include performing downlink SDMA transmission to the selected station as explained in detail above with reference to FIG. 3. Although the invention is not limited in this respect, the precoding matrices used by the PHY during the precoding stage of transmission may include values corresponding to the beamforming weights and/or power allocation scheme calculated at blocks 430 and 440, respectively.

Figure 5:
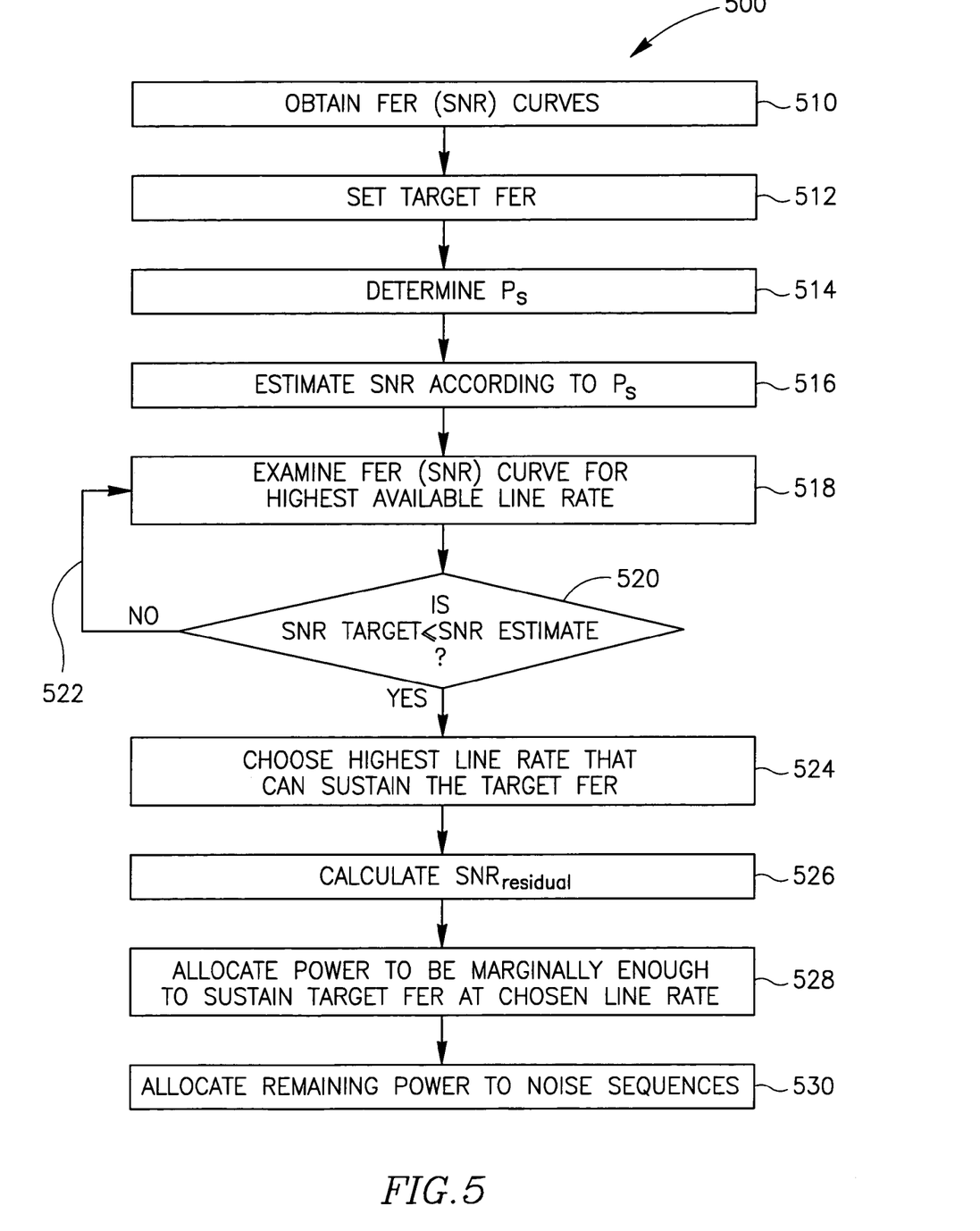
FIG. 5 is a schematic flowchart of a power allocation method in accordance with some demonstrative embodiments of the invention.

Reference is made to FIG. 5, which schematically illustrates a method 500 of power allocation according to some demonstrative embodiments of the invention. Although the invention is not limited in this respect, method 500 may be used to calculate the amount of power to be allocated to a signal to be transmitted to a selected station, e.g., station 101 (FIG. 1). Method 500 may be performed, e.g., by power allocation module 374 (FIG. 3).

It will be appreciated by those of skill in the art that a wireless communication system, e.g., system 100 of FIG. 1, may support transmission in several transmission rates ("line rates"). For example, the 802.11a standards support eight line rates for transmitting data, ranging from 6 Mbps to 54 Mbps. In general, a higher line rate may provide greater throughput of data frames, but may require a higher signal-to-noise ratio (SNR) to support the transmission at a desired frame error rate (FER).

Although some demonstrative embodiments of the invention are described herein with reference to implementing the SNR parameter as a quality of service parameter, and/or the FER parameters as a error parameter, it will be appreciated by those of ordinary skill in the art that other embodiments of the invention may relate to any other suitable quality of service and/or error parameters may be implemented.

In accordance with some demonstrative embodiments of the invention, as indicated at block 510, power allocation method 500 may include obtaining one or more curves of frame error rate as a function of SNR, e.g., for one or more possible line rates. Although the invention is not limited in this respect, the error rate curves may be calculated offline, e.g., based on theoretical simulations, and stored, e.g., in one or more fixed tables in SDMA preprocessor 370 (FIG. 3). For example, the $FER_{(SNR)}$ curves may be obtained empirically by simulating or measuring the performance of an actual system in several SNR points in an additive white Gaussian noise (AWGN) regime, e.g., as is known in the art.

In accordance with some demonstrative embodiments of the invention, as indicated at block 512, method 500 may include setting a target error parameter, e.g., a target FER. For example, a 10% FER may be acceptable in a WLAN.

According to some demonstrative embodiments of the invention, as indicated at block 514, method 500 may include determining an initial distribution of an available transmission power, denoted $P_T$, among the N channels. The distributed power, denoted $P_S$, allocated to the signal transmitted to the selected station may be calculated, for example, by dividing the available transmission power $P_T$, by the number of channels N, e.g., as follows:

$$P_S = P_T/N \quad (1)$$

Although the invention is not limited in this respect, $P_S$ may represent the maximum power to be allocated to a user signal, which may be derived, for example, from a configurable system parameter indicating a desired trade-off between performance and security. For example, the value of $P_S$ may be decreased from the value calculated by Equation 1 so as to be inversely proportional to the security level indicated in the tradeoff parameter. As $P_S$ is decreased, the security of the downlink transmission may be enhanced, since more energy may be dedicated to the noise sequences. Allocating more power to the noise sequences and less power to the user signal may result in a degraded SNR for stations other than the selected station.

According to some demonstrative embodiments of the invention, as indicated at block 516, method 500 may include estimating a first value of a QoS parameter that would result for the selected station from allocating power $P_S$ to the user signal of the selected station. For example, the method may include estimating the SNR that would result for the selected station from allocating power $P_S$ to the user signal of the selected station. A transmitting AP, such as AP 300 of FIG. 3, may estimate, for example, the potential SNR based on channel state information, e.g., including the channel norm $\|H\|$, and/or the power of background thermal noise, denoted $P_{thermal}$. For example, the channel state information may be estimated from the preamble signal of a previous uplink transmission received from the selected station, e.g., a CTS frame and/or an ACK frame. Although the invention is not limited in this respect, the following formula may be used:

$$SNR = \frac{P_S \cdot \|H\|}{P_{thermal}} \quad (2)$$

Although the invention is not limited in this respect, method 500 may include selecting a transmission rate at which to transmit to the selected station, for example, after calculating the first value of the QoS parameter, e.g., the estimated SNR corresponding to $P_S$, as indicated at blocks 518 through 524.

According to some demonstrative embodiments of the invention, the method may include determining a residual power corresponding to a difference between the first value of the QoS parameter and a second values of the QoS parameter corresponding to a desired quality of service; and allocating to K channels of the N channels, e.g., the channel of the user signal, transmission power corresponding to the residual power, e.g., as described in detail below.

As indicated at block 518, method 500 may include examining the $FER_{(SNR)}$ curve for the highest available line rate to lookup the SNR associated with the target FER ("the target SNR"). As indicated at block 520, method 500 may include comparing the target SNR with the estimated SNR, corresponding to power $P_S$. It will be appreciated that if the target SNR is less than the estimated SNR, the current line rate may not be sufficient to sustain the target FER. Thus, as indicated at loop arrow 522, method 500 may include dropping to the next highest line and examining the corresponding $FER_{(SNR)}$ curve to lookup a new target SNR. As indicated at block 524, when the estimated SNR corresponding to $P_S$ is greater than or equal to the target SNR for the particular line rate, method 500 may include choosing that line rate for transmission. It will be appreciated that the chosen line rate may be highest available line rate that can sustain the target FER if power $P_S$ is allocated to the user signal.

According to some demonstrative embodiments of the invention, as indicated at block 526, method 500 may include calculating a residual SNR that may be available to the destination station when its allocated power is $P_S$. For example, the residual SNR may be calculated as the difference between the estimated SNR and the target SNR for the chosen line rate.

According to some demonstrative embodiments of the invention, as indicated at block 528, power allocation method 500 may include allocating power to the beam directed at the selected station to be marginally sufficient to sustain the target FER at the chosen line rate. Thus, the selected station may receive the beam with just enough power to be able to decode the signal reliably at the chosen line rate. Although the invention is not limited in this respect, the allocated power, denoted $P'_s$, may be calculated according to the following formula:

$$P'_S = P_S - SNR_{residual} \quad (3)$$

According to some demonstrative embodiments of the invention, for example, when additional noise sequences are generated, method 500 may include allocating the remaining available power to the noise sequences, as indicated at block 530. For example, the following formula may be applied:

$$P'_n = P_n + SNR_{residual} \quad (4)$$

Some embodiments of the invention may be implemented by software, by hardware or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by system 100 of FIG. 1, by AP 110 of FIG. 1, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 114), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

What is claimed is:

1. A method of scheduling transmissions of one or more wireless communication stations, the method comprising:
   instructing a plurality of wireless communication stations to set a transmission-disable counter to count a first value corresponding to a selective-transmission time period during which transmission by only a selected one of said plurality of stations is to be allowed; and
   instructing the selected station by transmitting a protection end frame to the selected station such that the protection end frame is not received by one or more other stations of said plurality of stations thus setting the transmission-disable counter of the selected station to a second value that allows transmission of the selected station during at least part of said selective-transmission time period wherein the transmission of said protection end frame comprises generating a set of N spatial channels to be transmitted to said selected station, using a set of N respective antennas, by applying at least one precoding matrix to a set of inputs including said protection-end frame and one or more dither sequences, and
   wherein said precoding matrix includes a beamforming vector based on channel state information of said selected station and one or more additional vectors orthogonal to said beamforming vector.

2. The method of claim 1, wherein transmitting said protection-end frame comprises:
   allocating transmission power to a set of N spatial channels to be transmitted to said selected station such that the power to be received by said selected station is not greater, by more than a predefined power margin, than a minimum power required for reception at a desired quality of service.

3. The method of claim 1, wherein transmitting said protection-end frame comprises transmitting a contention-free-end frame.

4. The method of claim 1, wherein instructing said plurality of stations comprises transmitting a medium-access-control frame having a duration field corresponding to said first value.

5. The method of claim 4, wherein transmitting said medium-access-control frame comprises transmitting a clear-to-send-to-self frame.

6. The method of claim 1, wherein said transmission-disable counter comprises a network vector allocation counter.

7. An apparatus able to schedule transmissions of one or more wireless communication stations, the apparatus comprising:
   a transmission scheduler to instruct a plurality of wireless communication stations to set a transmission-disable counter to count a first value corresponding to a selective-transmission time period during which transmission by only a selected one of said plurality of stations is to be allowed wherein said transmission scheduler is able to instruct the selected station to set its transmission-disable counter by transmitting to said selected station a protection-end frame and instruct the selected station to set its transmission-disable counter to a second value that allows transmission of the selected station during at least part of said selective-transmission time period;
   the transmission scheduler being further able to transmit said protection-end frame such that said protection-end frame is not received by one or more other stations of said plurality of stations;
   a precoder to generate as set of N spatial channels to be transmitted to said selected station, using a set of N respective antennas, by applying at least one precoding matrix to a set of inputs including said protection-end frame and one or more dither sequences
   wherein said precoding matrix includes a beamforming vector based on channel state information of said selected station and one or more additional vectors orthogonal to said beamforming vector and
   a power allocator to allocate transmission power to the set of N spatial channels to be transmitted to said selected station such that the power to be received by said selected station is not greater, by more than a predefined power margin, than a minimum power required for reception at a desired quality of service.

8. The apparatus of claim 7, wherein said protection-end frame comprises a contention-free-end frame.

9. The apparatus of claim 7, wherein said scheduler is able to instruct said plurality of wireless communication stations to set said transmission-disable counter by transmitting a medium-access-control frame having a duration field corresponding to said first value.

10. The apparatus of claim 9, wherein said medium-access-control frame comprises a clear-to-send-to-self frame.

11. The apparatus of claim 7, wherein said transmission-disable counter comprises a network vector allocation counter.

12. A wireless communication system comprising:
    a plurality of stations;
    an access point to instruct said plurality of stations to set a transmission-disable counter to count a first value corresponding to a selective-transmission time period during which transmission by only a selected one of said plurality of stations is to be allowed; and instruct the selected station to set its transmission-disable counter to a second value that allows transmission of the selected station during at least part of said selective-transmission time period and set its transmission-disable counter by transmitting to said selected station a protection-end frame wherein said access point is able to transmit said protection-end frame such that said protection-end frame is not received by one or more other stations of said plurality of stations;
    a precoder to generate a set of N spatial channels to be transmitted to said selected station, using a set of N respective antennas, by applying at least one precoding matrix to a set of inputs including said protection-end frame and one or more dither sequences, wherein said precoding matrix includes a beamforming vector based on channel state information of said selected station and one or more additional vectors orthogonal to said beamforming vector; and a power allocator to allocate transmission power to a set of N spatial channels to be transmitted to said selected station such that the power to be received by said selected station is not greater, by more than a predefined power margin, than a minimum power required for reception at a desired quality of service.

13. The system of claim 12, wherein said protection-end frame comprises a contention-free-end frame.

14. The system of claim 12, wherein said access point is able to instruct said plurality of wireless communication stations to set said transmission-disable counter by transmitting a medium-access-control frame having a duration field corresponding to said first value.

15. The system of claim 14, wherein said medium-access-control frame comprises a clear-to-send-to-self frame.

16. The system of 12, wherein said transmission-disable counter comprises a network vector allocation counter.

* * * * *